United States Patent [19]

Horrey

[11] 3,995,657
[45] Dec. 7, 1976

[54] VALVE

[75] Inventor: Edward Lawrence Horrey, Sheerness, England

[73] Assignee: Wasco Limited, Sheerness, England

[22] Filed: June 10, 1975

[21] Appl. No.: 585,611

[30] Foreign Application Priority Data

June 12, 1974 United Kingdom ............ 26154/74

[52] U.S. Cl. .............................. 137/529; 137/532; 137/539; 220/202; 220/303
[51] Int. Cl.² .................. B65D 51/16; F16K 17/12; F16K 21/08
[58] Field of Search .......... 220/203, 202, 303, 210; 251/247, 303; 137/43, 513, 539, 526, 247.15, 529, 532, 527.8

[56] References Cited
UNITED STATES PATENTS

| 170,268 | 11/1875 | Hudson | 137/216.2 |
| 325,553 | 9/1885 | McKeen | 137/247.15 |
| 777,654 | 12/1904 | Hoon et al. | 137/539 |
| 1,000,206 | 8/1911 | Spurge | 251/229 |
| 1,151,230 | 8/1915 | Wilson | 137/539 |
| 1,372,506 | 3/1921 | Hartley | 137/526 |
| 1,460,900 | 7/1923 | Harris et al. | 251/247 |
| 1,520,585 | 12/1924 | Lusson | 220/303 |
| 1,699,101 | 1/1929 | Drager | 251/303 |
| 1,817,127 | 8/1931 | Crockett | 137/539 |
| 2,169,410 | 8/1939 | Drane | 137/532 |

Primary Examiner—William Price
Assistant Examiner—Allan N. Shoap
Attorney, Agent, or Firm—Parmelee, Miller, Welsh & Kratz

[57] ABSTRACT

A liquid fuel filler cap provided with a valve assembly in a channel extending through said cap said valve assembly comprising means defining at least part of a channel, a valve seat in said channel, a valve member adapted to co-operate with said valve seat to seal said channel, and means to bias said valve member into engagement with said seat, said biasing means comprising a pivoted member comprising a first portion which is adapted to move said valve member, and a second portion, and means for engaging with said second portion and for imparting a turning moment to said pivoted member which is greater than and in the opposite sense to the turning moment imparted to the pivoted member by said valve member alone when the valve member moves away from the valve seat, said first portion and said second portion being on opposite sides of the point of pivotal support of said pivoted member.

5 Claims, 4 Drawing Figures

VALVE

This invention relates to a valve and more particularly to a valve adapted to be utilised in conjunction with a liquid fuel tank. A valve in accordance with the invention may be formed integrally with a fuel filler cap for such a tank.

Liquid fuel utilised in motor cars and other such vehicles is stored in a tank and is drawn from the tank by means of a pump and subsequently fed to a carburettor or other device attached to the engine of the vehicle. If the tank is completely sealed, and if an air-tight cap is located on the filler of the tank, when the pump operates, withdrawing fuel from the tank, the pressure of air above the fuel contained within the tank reduces, and in extreme circumstances the tank can collapse due to the effect of external atmospheric pressure applied to the tank.

If a fuel tank is provided with a vent channel, in the form of a permanently opened channel extending through the filler cap, or in the form of a vent pipe provided in the vehicle permitting the interior of the tank to communicate with the atmosphere and if the vehicle is involved in an accident, or if the vehicle wholly or partially overturns, there is a severe risk that fuel will be discharged from the petrol tank through the vent channel presenting a fire hazard.

Certain safety regulations have been proposed requiring that petrol should not be discharged from a petrol tank when a vehicle is overturned and it is an object of the present invention to provide a valve which will enable a vehicle fuel tank to be vented to prevent collapse of the tank whilst preventing fuel from being discharged through the vent if the vehicle is overturned.

According to the broadest aspect of this invention there is provided a valve assembly comprising means defining at least part of a channel, a valve seat in said channel, a valve member adpated to co-operate with said valve seat to seal said channel, and means to bias said valve member into engagement with said seat, said biasing means comprising a pivoted member having a first portion which is adapted to move said valve member, and a second portion and means for engaging with said second portion and for imparting a turning moment to said pivoted member which is greater than and in the opposite sense to the turning moment imparted to the pivoted member by said valve member alone when the valve member moves away from the valve seat, said first portion and said second portion being on opposite sides of the point of pivotal support of said pivoted member.

It will be appreciated that when air pressure acts on said valve member to open the valve the force exerted by the biasing means may be overcome.

Conveniently the valve member may be a spherical member such as a ball bearing and advantageously the biasing means may comprise a further spherical member such as a ball bearing, the further member being of greater mass than the valve member and capable of imparting a turning moment to the pivoted member. Conveniently the pivoted member may be a metal member.

Advantageously the spherical members may both be located on the same side of the pivoted member and the spherical further member may be accommodated within a blind chamber having diverging walls.

Preferably a spring is provided to co-operate with said second spherical member to bias the second spherical member towards the pivoted member.

According to another aspect of this invention there is provided a liquid fuel filler cap provided with a valve assembly in a channel extending through said cap said valve assembly comprising means defining at least part of a channel, a valve seat in said channel, a valve member adapted to cooperate with said valve seat to seal said channel, and means to bias said valve member into engagement with said seat, said biasing means comprising a pivoted member comprising a first portion which is adapted to move said valve member, and a second portion, and means for engaging with said second portion and for imparting a turning moment to said pivoted member which is greater than and in the opposite sense to the turning moment imparted to the pivoted member by said valve member alone when the valve member moves away from the valve seat, said first portion and said second portion being on opposite sides of the point of pivotal support of said pivoted member.

In order that the invention may be more readily understood and so that further features thereof may be appreciated, a liquid fuel filler cap provided with a valve in accordance with the invention will now be described by way of example with reference to the accompanying drawings in which.

Figure 1:
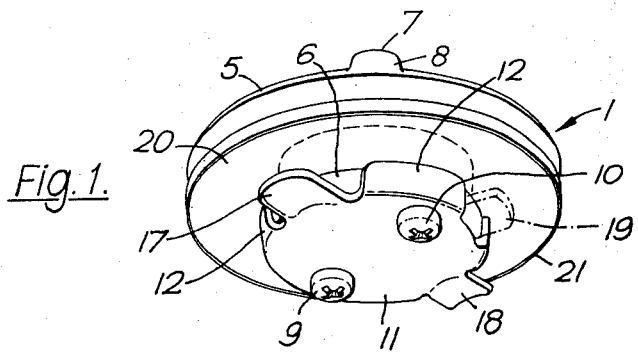
FIG. 1 is a perspective view from below of the liquid fuel filler cap.

Referring to the drawings a liquid fuel filler cap 1 is provided with a valve 2 in accordance with the invention. The liquid fuel filler cap 1 is adapted to be secured to the neck 3 of the filler pipe of a fuel tank, and is adapted substantially to seal the neck 3 of the filler pipe.

The fuel filler cap 1 comprises a plastics material housing 4 comprising a substantially circular plate like member 5 having a hollow central cylindrical boss 6 protruding from one side thereof. Protruding from the other side of the plate like member 5 is a diametrically extending rib 7, the diametrically opposed end portions 8 of the rib 7 being slightly thicker than the central portion of the rib. The rib 7 is adapted to be grasped by the fingers of a user to enable the cap 1 to be rotated to secure the cap to the neck 3 of the filler pipe of a fuel tank, and to release the cap 1 therefrom.

Figure 4:
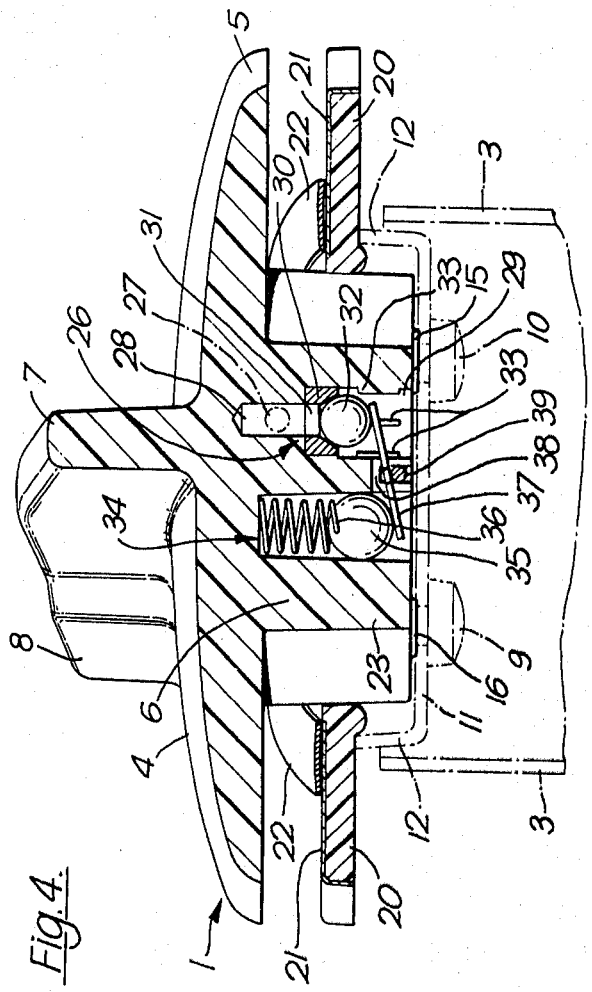
FIG. 4 is a sectional view taken on the line 4—4 of FIG. 3, this figure being to an enlarged scale, the liquid fuel filler cap being shown adjacent the neck of the filler pipe of a fuel tank.

Secured to the lower open end of the hollow central boss 6 by means of two screws 9, 10 is a cover plate 11, which is generally circular, and which has a plurality of flanges 12 which embrace the lowermost part of the boss 6. The screws 9, 10 engage with two bores 13, 14, provided in the boss 6, the portions of the boss adjacent the openings of the bores 13, 14 being raised 15, 16 so that the cover plate 11 is slightly spaced from the major portion of the end of the boss 6 as shown in FIG. 4. The cover plate 11 has two outwardly extending lugs 17, 18 which, as can be seen in FIG. 2, are generally arcuate in elevation. The two lugs 17, 18 may engage with corresponding portions of the neck 3 of a filler pipe to secure the cap 1 releasably in position. A third lug 19 may be provided as shown in dotted lines in FIGS. 1 and 2, this lug 19 being movable radially inwardly and outwardly by means of a lock to enable the fuel filler cap 1 to be locked in position. However, it is to be understood that the invention is equally applicable to a fuel filler cap which is not provided with such a third lug 19 and a lock.

Surrounding the central boss 6 is an annular sealing member 20 which is formed of relatively stiff plastics material the washer being reinforced by a metallic annular insert 21. An annular spring spacing washer 22 also surrounds the central boss and is located between the annular sealing member 20 and the plate like member 5. The annular sealing member 20 is so dimensioned that the portion of the sealing member 20 that engages the boss 6 forms a substantially air-tight seal, and the spring spacing washer 22 is such that the sealing member 20 is biased towards the cover plate 11. It will be appreciated that the flanges 12 provided on the cover plate 11 which embrace the terminal end portion of the boss 6 serve to retain the annular sealing member 20 in position.

Figure 2:
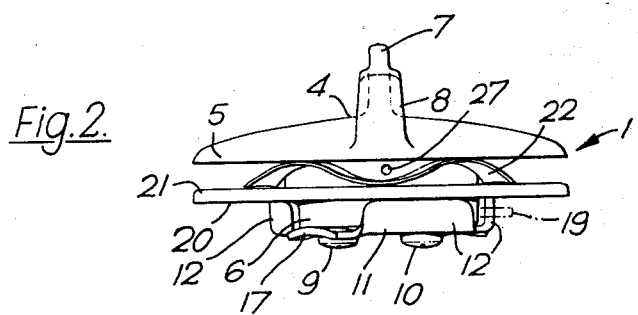
FIG. 2 is a side view of the liquid fuel filler cap shown in FIG. 1.
Figure 3:
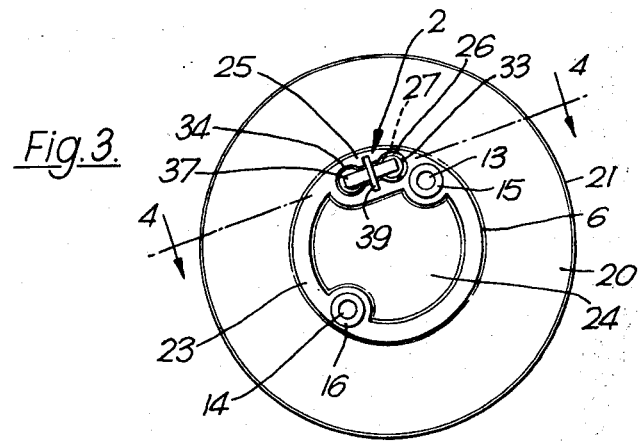
FIG. 3 is a plan view of the underside of the liquid fuel filler cap shown in FIG. 1 and FIG. 2 with the cover plate removed.

When the filler cap 1 as shown in FIGS. 1 and 2 is secured to the neck 3 of the filler pipe of a fuel tank the sealing member 20 will engage with the neck 3 of the filler pipe and the spring washer 22 will bias the sealing member 20 into firm contact therewith, and thus a substantially air-tight seal is formed.

The central cylindrical boss 6 is substantially hollow and thus the boss merely comprises an annular wall 23 extending from the plate like member 5 and surrounding a central cavity 24. However, a portion 25 of this annular wall 23 is somewhat thicker than the remainder of the annular wall, and this thicker portion of the annular wall contains a valve 2, as will be described hereinafter in more detail. The valve 2 comprises a first blind chamber 26 which extends perpendicularly to the plane of the plate like member 5. A bore 27 extends in a plane which is substantially parallel to the plane of the plate like member 5 through the side wall 23 of the boss 6 and communicates with the blind chamber 26 to form an air channel. The bore 27 is located adjacent the plate like member 5 so that when the filler cap 1 is positioned on the neck 3 of the filler pipe of a fuel tank the open end of the bore 27 in the side wall 23 of the boss 6 is in direct communication with the atmosphere, and thus the interior of the said blind chamber 26 is in communication with the atmosphere. The blind chamber has a closed end portion 28 and an open end portion 29 of greater diameter than the closed end portion 28, and located at the junction between these two portions 28, 29 of the blind chamber 26 of different diameter is a valve seat 30 which is formed of brass. The valve seat 30 has a generally frusto-conical aperture 31 defined therein, and this aperture is adapted to co-operate with a spherical member 32, such as a ball bearing, to form a substantially fluid-tight seal. A plurality of inwardly directed ribs 33 are formed on the interior wall of the portion 29 of the blind chamber 26 of greater diameter, these ribs 33 being adapted to guide the ball bearing 32 to sit on the valve seat 30. A second blind chamber 34 is provided adjacent the first blind chamber 26, the second blind chamber 34 being of larger diameter than the portion 28 of the first blind chamber 26 of smaller diameter. The walls of the second blind chamber 34 are slightly divergent so that the open end of the chamber 34 has a greater area than the closed end of the chamber 34. The second blind chamber 34 accommodates a second spherical member 35 in the form of a second ball bearing, which is of greater diameter and greater mass than the first ball bearing 32. Located between the closed end of the second blind chamber 34 and the second ball bearing 35 is a helical phosphor-bronze spring 36.

A metal pivoted member 37 is provided which is pivoted on a portion 38 of the boss 6 which is located between the two blind chambers 26, 34 so that the two end portions of the pivoted member 37 each extend across the open end of one of said blind chambers 26, 34. The pivoted member 37 is provided with two outwardly directed pivoted lugs which engage with corresponding recesses provided in the boss, and an axle 39 is provided which is located over the pivot lugs, the cover plate 11 engaging with the axle 39 to retain the pivoted member 37 in position. The pivot member engages with the ball bearings 32, 35 and the mode or operation of the valve will be described hereinafter.

The cover plate 11 is spaced from the boss 6 by the raised portions 15, 16 so that an air channel is provided between the area immediately adjacent the pivoted member 37 and the surface of the cover plate 11 which is located in the neck 3 of the filler pipe of a fuel tank when the fuel cap 1 is in position. Thus it will be appreciated that if the first ball bearing 32 is moved away from the valve seat 30 then an air channel will exist through the bore 27, the first blind chamber 27 and air may pass the valve member 30 to enter the fuel tank.

The second blind chamber 34 has slightly diverging side walls and it is important to note that the ball bearing 35 contained in the second blind chamber 34 has a larger mass than the first ball bearing 32 which co-operates with the valve seat 30. The ball bearing 35 accommodated in the second blind chamber 34 may, for example, be larger than the first ball bearing 32, or may be formed of a denser material.

In utilising a filler cap 1 provided with a valve in accordance with the present invention with the filler cap 1 in any orientation the first ball bearing 32 will be urged towards the valve seat 30 and will provide a seal to prevent fluid escaping from the fuel tank. Thus if the filler cap 1 is in the orientation illustrated in FIG. 4 (i.e. generally horizontal) it will be noted that the ball bearing 35 of larger mass will act on the pivoted member 37 and will impart a greater turning moment to the pivoted member 37 than the pivotal moment imparted to the pivotal member by the ball bearing 32 constituting the valve member. This is because the two ball bearings 32, 35 are equally spaced from the point of pivotal support of the pivoted member, and the ball bearing 35 of greater mass thus exerts a greater turning moment on the pivoted member 37. Thus the ball bearing 32 constituting the valve member is urged into contact with the valve seat 30, thus constituting a substantially air-tight seal.

If the filler cap 1 is inverted, so that the cap is in precisely the opposite orientation to that as shown in FIG. 4, the ball bearing 32 constituting the valve member will be urged into contact with the valve seat 30 under the influence of gravity, thus forming a substantially fluid tight seal. If the filler cap 1 is held in an intermediate position, i.e. if the filler cap 1 is notionally rotated by 90° from the position illustrated in FIG. 4 so that the plate like member 5 is substantially vertical, the ball bearing of greater mass 35 will tend to roll down the then inclined side walls of the second blind chamber 34 thus urging the end portion of the pivoted member 37 adjacent heavier ball bearing 35 away from the end of the blind chamber 34. Thus the other end portion of the pivoted member 37 will urge the ball bearing 32 constituting the valve member against the frusto-conical aperture 31 provided in the valve seat 30 to close the valve. Also the action of the spring 36 biasing the ball bearing 35 of greater mass away from the base of the second blind chamber will assist the pivoted member 37 to bias the ball bearing 32 constituting the valve member into contact with the valve seat 30.

From the foregoing it will be appreciated that in any orientation of the filler cap the ball bearing 32 constituting the valve member is biased towards the valve seat 30 to constitute a substantially fluid tight seal to prevent any liquid or fluid or gas escaping from the tank of a motor vehicle.

When the filler cap 1 as above described is utilised on the neck 3 of the filler pipe of a fuel tank of a vehicle, if the fuel tank has no vents the pressure within the tank will fall as fuel is pumped from the tank by the fuel pump of the vehicle. When the pressure within the tank reaches a certain predetermined value the effect of the air pressure acting on the ball bearing 32 constituting the valve member, (the air pressure passing through the bore 27 and the portion 28 of the first blind chamber 26 of lesser diameter), the ball bearing 32 constituting the valve member will, temporarily, move away from the valve seat 30, thus permitting air to enter the fuel tank to equalise the pressure within the tank with the ambient atmospheric pressure. Thus it will be appreciated that in utilising a filler cap 1 as herein before described any substantial fall of pressure within the fuel tank will be relieved, thus preventing the tank from collapsing.

From the foregoing description it will be appreciated that with the fuel filler cap 1 in any orientation the valve 2 will prevent fluid escaping from the tank whilst permitting air to enter the tank when the pressure within the tank falls below a predetermined value. Thus if a motor vehicle is provided with a filler cap 1 as herein described provided that the tank of the motor vehicle has no vents, if the vehicle is involved in an accident, provided that the tank is not ruptured, no fuel should escape from the tank. Thus the risk of fire may be reduced.

Whilst the invention has been described with specific reference to a fuel of filler cap 1 it will, of course, be appreciated that a valve 2 in accordance with the invention may be incorporated in a vent pipe provided on a petrol tank, rather than being provided in a fuel filler cap 1. Furthermore it will be appreciated that there are many other alternative locations for a valve 2 in accordance with the invention.

Again, whilst the invention has been described with reference to one particular embodiment in which the valve member 30 and the further member 35 are both formed as ball bearings, it is to be understood that the valve member and the further member may be formed as items other than ball bearings.

I claim:

1. A valve assembly for automatically relieving the partial vacuum in an unvented tank or container caused by withdrawing the fluid contents therefrom, said valve assembly comprising:
    means defining a channel, the outer end of said channel in open communication with the atmosphere and the inner end in open communication with the tank interior,
    a valve seat disposed within the channel,
    a valve member cooperative with said valve seat to seal the channel, and
    biasing means to bias said valve member into engagement with the valve seat, comprising a pivoted member on a pivotal support, one end of which pivoted member engages the valve member and the other end of which engages means for imparting a turning moment to the pivoted member greater than the turning moment imparted to the pivoted member by the valve member alone, said ends of the pivoted member being on opposite sides of the point of pivotal support of said pivoted member,
    the valve member being in a normally closed position in all orientations of the valve assembly, said valve member being biased to a normally closed position by the biasing means when the outer end of the channel is higher than the inner end and by gravity when the inner end of the channel is higher than the outer end, and
    the valve member being urged out of engagement with the valve seat by atmospheric pressure to permit air to enter the tank when the pressure differential between the atmosphere and the interior of the tank is sufficient to overcome the biasing effect on the valve member and the valve member being returned to its normally closed position when the partial vacuum in the tank has been relieved.

2. A valve according to claim 1, wherein said valve member is a spherical member.

3. A valve according to claim 2, wherein the biasing means comprise a second spherical member of greater mass than the valve member and capable of imparting a turning moment to the pivoted member.

4. A valve according to claim 3, wherein the spherical members are located on opposite sides of the pivotal support and on the same side of the pivoted member and the second spherical member is accommodated in a blind chamber having diverging walls.

5. A valve according to claim 3, wherein a spring is provided to cooperate with said second spherical member to position the second spherical member in contact with the pivoted member.

* * * * *

UNITED STATES PATENT OFFICE
CERTIFICATE OF CORRECTION

PATENT NO. : 3,995,657
DATED : December 7, 1976
INVENTOR(S) : Edward Lawrence Horrey It is certified that error appears in the above-identified patent and that said Letters Patent are hereby corrected as shown below:

On the cover page, item [73], the Assignee should be identified as follows:

[73] Assignee: Waso Limited, Sheerness, England

Signed and Sealed this

Twelfth Day of April 1977

[SEAL]

Attest:

RUTH C. MASON
Attesting Officer

C. MARSHALL DANN
Commissioner of Patents and Trademarks